(12) United States Patent
Kuo et al.

(10) Patent No.: US 9,110,352 B2
(45) Date of Patent: Aug. 18, 2015

(54) SYSTEMS AND METHODS FOR FIBER OPTIC PARAMETRIC AMPLIFICATION AND NONLINEAR OPTICAL FIBER FOR USE THEREIN

(71) Applicant: The Regents of the University of California, Oakland, CA (US)

(72) Inventors: Ping Piu Kuo, San Diego, CA (US); Stojan Radic, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/935,369

(22) Filed: Jul. 3, 2013

(65) Prior Publication Data

US 2013/0314767 A1 Nov. 28, 2013

Related U.S. Application Data

(63) Continuation of application No. 13/444,792, filed on Apr. 11, 2012, now Pat. No. 8,482,847.

(60) Provisional application No. 61/474,149, filed on Apr. 11, 2011.

(51) Int. Cl.
*G02F 1/39* (2006.01)
*G02B 6/02* (2006.01)
*H01S 3/094* (2006.01)
(Continued)

(52) U.S. Cl.
CPC ............... *G02F 1/395* (2013.01); *G01J 3/0245* (2013.01); *G01J 3/12* (2013.01); *G02B 6/02219* (2013.01); *G02F 1/3544* (2013.01); *H01S 3/094096* (2013.01); *H01S 3/302* (2013.01); *G01J 3/32* (2013.01); *G02B 6/0281* (2013.01); *G02B 6/0365* (2013.01); *G02F 2001/392* (2013.01); *G02F 2201/02* (2013.01);
(Continued)

(58) Field of Classification Search
USPC ................... 385/122, 126, 127; 359/326–332
See application file for complete search history.

(56) References Cited

U.S. PATENT DOCUMENTS 5,327,516 A 7/1994 Chraplyvy et al.
6,078,715 A * 6/2000 Fujii et al. ..................... 385/124
(Continued)

OTHER PUBLICATIONS

Karlsson, Magnus. Four-wave mixing in fibers with randomly varying zero-dispersion wavelength, vol. 15, No. 8, Aug. 1998, J. Opt. Soc. Am B., pp. 2269-2275.
(Continued)

*Primary Examiner* — Daniel Petkovsek
(74) *Attorney, Agent, or Firm* — Eleanor Musick; Greer, Burns & Crain, Ltd.

(57) ABSTRACT

A high confinement nonlinear optical fiber is provided along with methods of parametric amplification for use thereof The nonlinear optical fiber may include a plurality of concentric layers which are configured to provide different guiding regimes to low-frequency and high-frequency components through transverse geometry and refractive index profiling, thus reducing waveguide dispersion. The resulting optical fiber provides a parametric device with phase-matching in any spectral region of interest, such that a fiber optic parametric amplifier (FOPA) implementing the optical fiber can amplify in any spectral window of interest. A narrow-band FOPA configured to minimize phase mismatching is also provided for use with the optical fiber, and may be implemented as a light source or a monochromator.

14 Claims, 10 Drawing Sheets

(51) Int. Cl.
| | |
|---|---|
| *H01S 3/30* | (2006.01) |
| *G01J 3/02* | (2006.01) |
| *G01J 3/12* | (2006.01) |
| *G02F 1/35* | (2006.01) |
| *G02B 6/028* | (2006.01) |
| *G02B 6/036* | (2006.01) |
| *H01S 3/067* | (2006.01) |
| *H01S 3/08* | (2006.01) |
| *G01J 3/32* | (2006.01) |

(52) U.S. Cl.
CPC ........ *H01S 3/06729* (2013.01); *H01S 3/06791* (2013.01); *H01S 3/0809* (2013.01); *H01S 3/08027* (2013.01)

(56) References Cited

U.S. PATENT DOCUMENTS

| | | | |
|---|---|---|---|
| 6,625,363 | B2 | 9/2003 | Carter et al. |
| 6,959,022 | B2 * | 10/2005 | Sandrock et al. ............... 372/6 |
| 7,266,275 | B2 | 9/2007 | Hansen et al. |
| 7,339,721 | B1 | 3/2008 | Berkey et al. |
| 7,400,807 | B2 * | 7/2008 | Minelly et al. ............... 385/124 |
| 7,440,167 | B2 | 10/2008 | Taniguchi et al. |
| 7,483,614 | B2 | 1/2009 | Hirano et al. |
| 2002/0057880 | A1 | 5/2002 | Hirano et al. |
| 2004/0234219 | A1 * | 11/2004 | Aikawa et al. ............... 385/127 |
| 2006/0239604 | A1 | 10/2006 | Marhic et al. |
| 2009/0257724 | A1 * | 10/2009 | Taniguchi et al. ........... 385/122 |
| 2009/0296743 | A1 | 12/2009 | Islam |

OTHER PUBLICATIONS

Onishi M. et al. Invited Paper, Highly Nonlinear Dispersion-Shifted Fibers and Their Application to Broadband Wavelength Converter, Optical Fiber Technology 4, Article No. OF980248, 1998, pp. 204-214.

Radic, Stojan et al. Optical Amplification and Signal Processing in Highly Nonlinear Optical Fiber, IEICE Trans. Electron., vol. E88-C, No. 5, May 2005, pp. 859-869.

Foster, Mark A. et al. Broad-band optical parametric gain on a silicon photonic chip, Nature, vol. 441, Jun. 22, 2006, doi:10.1038/nature04932, 4 pages.

Galili, Michael et al. Breakthrough switching speed with an all-optical chalcogenide glass chip: 640 Gbit/s demultiplexing, Optics Express, Feb. 16, 2009, vol. 17, No. 4, pp. 2182-2187.

Radic, Stojan. Parametric Signal Processing, IEEE Journal of Selected Topics in Quantum Electronics, vol. 18, No. 2, Mar./Apr. 2012, pp. 670-680.

Farahmand M. and M. de Sterke. "Parametric amplification in presence of dispersion fluctuations," Optics Express 12, pp. 136-142 (2004).

Yaman F. , et al. "Impact of dispersion fluctuations on dual-pump fiber-optic parametric amplifiers," IEEE Photonics Technology Letters 16, pp. 1292-1294 (2004).

Velanas P. , et al. "Impact of dispersion fluctuations on the noise properties of fiber optic parametric amplifiers," Journal of Lightwave Technology 24, pp. 2171-2178 (2006).

Foster M. A. , et al., "Broad-band optical parametric gain on a silicon photonic chip," Nature 441, pp. 960-963 (2006).

Wiberg A. O. J. , et al., "640-Gb/s transmitter and self-tracked demultiplexing receiver using single parametric gate," IEEE Photon. Technol. Lett. 23, pp. 507-509 (2011).

Slavik R. , et al., "All-optical phase and amplitude regenerator for next-generation telecommunications systems," Nature Photon. 4, pp. 690-695 (2010).

Kuo B. P. P. , et al. "Transmission of 640-Gb/s RZ-OOK Channel over 100-km SSMF by wavelength-transparent conjugation," J. Lightwave Technol. 29, pp. 516-523 (2011).

Sunnerud H. , et al. "Optical add-drop multiplexer based on fiber optical parametric amplification," in Proc. ECOC 2007, paper 5.3.5., 2 pages.

Wiberg A. O. J. , et al. "Performance of self-seeded parametric multicasting of analog signal," IEEE Photon. Technol. Lett. 23, pp. 1570-1572 (2011).

Jiang R. , et al. "Continuous-wave band translation between the near-infrared and visible spectral ranges," J. Lightwave Technol. 25, pp. 58-66 (2007).

Gholami F., et al. "10Gbps parametric short-wave infrared transmitter," in Proc. OFC/NFOEC 2011, paper OThC6, 2011, 3 pages.

Hirano M. , et al. "Silica-based highly nonlinear fiber and their application," IEEE J. Select. Topics Quant. Electron 15, pp. 103-113 (2009).

Myslivets E. , et al. "A new class of high-resolution measurements of arbitrary-dispersion fibers: localization of four-photon mixing process," J. Lightwave Technol. 27, pp. 364-375 (2009).

Yu M., et al. "Modulational instabilities in dispersion flattened fibers," Phys. Rev. E 52, pp. 1072-1080 (1995).

Marhic M. E. , et al. "Wide-band tuning of the gain spectra of one-pump fiber optical parametric amplifiers," IEEE J. Select. Topics Quantum Electron. 10, 1133-1141 (2004).

Kuo B. P. P. , et al. "Simultaneous wavelength-swept generation in NIR and SWIR bands over combined 329-nm band using swept-pump fiber optical parametric oscillator," J. Lightwave Technol. 29, pp. 410- 416 (2011).

Gershikov A. , et al. "Fiber parametric oscillator for the 2 micron wavelength range based on narrowband optical parametric amplification," Opt. Lett. 35, pp. 3198-3200 (2010).

Moro S. , et al., "Synthesis of equalized broadband parametric gain by localized dispersion mapping," IEEE Photon. Technol. Lett. 20, pp. 1971-1973 (2008).

Myslivets E. , et al. "Dispersion fluctuation equalization nonlinear fibers of spatially controlled tension," in Proc. OFC/NFOEC 2010, paper OTuA5, 2010, 3 pages.

Gabrielli L. H. , et al., "Robustness optimization of fiber index profiles for optical parametric amplifiers," J. Lightwave Technol. 27, pp. 5571-5579 (2009).

Boggio J. M. Chavez, et al. "Tunable parametric all-fiber short-wavelength IR transmitter," J. Lightwave Technol. 28, pp. 443-447 (2010).

Bogatyrev V. A. et al. "A single-mode fiber with chromatic dispersion varying along the length," J. Lightwave Technol. 9, pp. 561-566 (1991).

Kato T. , et al. "Estimation of nonlinear refractive index in various silica-based glasses for optical fibers," Opt. Lett. 20, pp. 2279-2284 (1995).

Wada A. , et al. "Suppression of stimulated Brillouin scattering by intentionally induced periodic residual—strain in single-mode optical fibers," IEICE Trans. Commun. E76 B, pp. 345-351 (1993).

Kylemark P. , et al. "Impact of pump phase-modulation on the bit-error rate in fiber-optical parametric-amplifier-based systems," IEEE Photon. Technol. Lett. 19, pp. 79-81 (2007).

Kuo, Bill P.P. et al. Highly nonlinear fiber with dispersive characteristic invariant to fabrication fluctuations, Opt Express. Mar. 26, 2012;20(7); pp. 7716-7725.

International Search Report and Written Opinion issued Oct. 31, 2012 for PCT/US2012/033160, 9 pages.

\* cited by examiner

SYSTEMS AND METHODS FOR FIBER OPTIC PARAMETRIC AMPLIFICATION AND NONLINEAR OPTICAL FIBER FOR USE THEREIN

CROSS-REFERENCE TO RELATED APPLICATIONS

This is a continuation of application Ser. No. 13/444,792, filed Apr. 11, 2012, issued Jul. 9, 2013 as U.S. Pat. No. 8,482,847, which claims priority to U.S. Provisional Application No. 61/474,149, filed Apr. 11, 2011, now pending, the content of which is incorporated by reference herein in its entirety.

FIELD OF THE INVENTION

Embodiments described herein relate to systems and methods for fiber optic parametric amplification, and more specifically to devices for spectrally-distant light generation and conversion through phase-matched parametric interaction, and a nonlinear optical fiber for use therein.

BACKGROUND OF THE INVENTION

Optical fiber technology has been a major driver behind the information technology revolution and the rapid progress in global telecommunications. Fiber optics have become a standard transmission medium for voice, video and data signals, serving as a foundation for virtually every form of communication network, from interoffice to trans-oceanic.

Three general trends in signal processing have recently emerged in communication and sensing applications. The first is recognized in increased signal bandwidths that are no longer compatible with conventional electronics. The second trend is driven by large dynamic range expected from a mixed (analog/digital) signal processor. Finally, the standard (incoherent) processing is being eliminated with the introduction of fully-coherent optical links.

Parametric mixers are recognized as a core processing technology in this regard and have been investigated in silica, silicon and semiconductor platforms. One example of a parametric mixer is the fiber optic parametric amplifier (FOPA), can be used in lightwave systems for applications such as optical amplification, phase conjugation, and wavelength conversion. In principle, FOPAs can provide uniformly high gain over a wide range of wavelenths (>100 nm). Further, FOPAs add little noise to the amplified signal, with a noise figure as low as 0 dB when operated in the phase-sensitive mode and 3 dB in the phase-insensitive mode. However, in practice, these advantages are adversely impacted by factors that include irregularities in fiber construction and performance.

With octave-wide bandwidth and high figure of merit (FoM) driven by a long interaction length, fiber-optic mixers represent particularly important class of processing engines. They allow for power-efficient access to ultrafast signals, with applications ranging from Tb/s channel transport, propagation impairment reversal, packet manipulation, and, more recently, complex analog signal acquisition and wavelength conversion to non-conventional bands. Highly-nonlinear fiber (HNLF) has been the most important mixer platform to date, and is responsible for a majority of the advances made in low-power, high-bandwidth parametric devices.

Regardless of specific device functionality, its power efficiency, noise and bandwidth metrics are uniquely determined by the phase-matching condition of the underlying four-photon mixing (FPM) processes. Phase matching in fiber parametric mixers is defined by the combination of material and waveguide dispersion characteristics. The latter is recognized as a powerful tool in tailoring the mixer response over large spectral range: a conventional HNLF index profile allows for significant dispersion change even with small transverse fiber geometry alterations. While this sensitivity is clearly desirable for phase-matched design, it also introduces the fundamental phase-matching limit. In addition to deterministic core variation, HNLF fabrication is accompanied by inherently stochastic microscopic fluctuation that leads to considerable dispersion variation. As a result, phase-matching variance along the fiber length severely impacts the performance of a mixer relying on long interaction length, denying the advantage of fiber-based mixer construction. Specifically, distant-band parametric mixer relying on negative fourth-order dispersion is recognized as the most sensitive to such dispersive fluctuations. For this reason, recent demonstrations have exclusively relied on standard dispersion-shifted fiber (DSF), rather than existing HNLF type. To maintain the FoM of a DSF mixer, pump powers had to be scaled by nearly an order of magnitude, as required by the ratio between HNLF and DSF nonlinear coefficients.

Recognizing this limitation, various post-fabrication correction schemes have been demonstrated. Such approaches typically require longitudinal mapping of local dispersion fluctuations and must be followed by either selection/concatenation of useful sections or localized dispersion equalization. In contrast, pre-fabrication measures for HNLF design with inherent resilience to local geometry fluctuation are highly desirable yet remain largely unexplored. Rare attempts to rectify the dispersion fluctuation via unconstrained optimization were driven by purely mathematical formulation and have resulted in index profiles that are either not manufacturable using commercially practical methods or possess nonlinear coefficients similar to that of the standard fibers.

In order to realize the true potential of parametric mixers, including FOPAs, the need exists for an optical fiber that is compatible with practical HNLF manufacturing techniques that is capable of satisfying the phase matching requirements of parametric mixer devices

SUMMARY OF THE INVENTION

Embodiments described herein provide a dual-transmission medium, high confinement nonlinear optical fiber along with systems and methods of parametric amplification for use thereof In one embodiment, the nonlinear optical fiber includes at least two concentric layers which are configured to provide different guiding regimes to low-frequency and high-frequency components through transverse geometry and refractive index profiling, thus reducing waveguide dispersion change due to fiber transversal geometry deviation. The optical fiber satisfies precise physical properties that are necessary for practical parametric mixer device construction. The resulting optical fiber can achieve phase-matching in any spectral region of interest, such that a fiber optic parametric amplifier (FOPA) implemented using the optical fiber can amplify in any spectral window of interest. A narrow-band FOPA configured to minimize phase mismatching is also provided for use with the dual-core optical fiber, and may be implemented as a light source or a monochromator.

In one embodiment, an optical fiber comprises: at least one first light transmissive medium; at least one second light transmissive medium concentrically surrounding the first light transmissive medium; wherein the optical fiber has a dispersion accuracy, and wherein the dispersion accuracy of the optical fiber, in terms of a normalized dispersion fluctuation parameter f, is approximately less than 5.

The optical fiber may exhibit less than 1 ps/nm/km (picoseconds per nanometer per kilometer) change in dispersion in response to a 1 percent change in a radial dimension of the optical fiber.

The optical fiber may have an effective mode area of the optical fiber that is less than approximately 50 $\mu m^2$ (square micrometers).

The at least one second light transmissive medium may be a cladding.

The at least one first transmissive medium may be a core.

The optical fiber may further comprise a plurality of optical fibers arranged in a group and concentrically surrounded by a cover to form a fiber optic cable.

In another embodiment, a fiber optic device which performs a parametric process using the optical fiber as recited above.

The fiber optic device may be a fiber optic parametric amplifier which performs parametric amplification.

In a further embodiment, an optical fiber comprises: an inner concentric core; an outer concentric core concentrically surrounding the inner core; and at least one cladding layer concentrically surrounding the outer core.

The optical fiber has a dispersion accuracy, wherein the dispersion accuracy of the optical fiber, measured in terms of a normalized dispersion fluctuation parameter f, is less than approximately 5.

The optical fiber may exhibit less than approximately 1 picosecond per nanometer per kilometer (ps/nm/km) change in dispersion in response to a 1 percent change in a radial dimension of the optical fiber.

The the effective mode area of the optical fiber may be less than approximately 50 $\mu m^2$ (square micrometers).

The optical fiber may be connected with a fiber optic device which is configured to execute a parametric process within the optical fiber.

The optical fiber may further comprise an intermediate cladding layer positioned between the outer core and the cladding layer.

The inner concentric core and outer concentric core may have different index contrasts.

In a still further embodiment, a method of operating a parametric mixer device comprises: receiving at least one optical wave at the parametric mixer device; performing a parametric mixing operation on the at least one received optical wave; and transmitting an output optical wave to an optical fiber connected with the parametric mixer device; wherein an effective area of the optical fiber is approximately less than 50 $\mu m^2$ (square micrometers), and wherein a dispersion fluctuation parameter f is approximately less than 5.

A spooling diameter of the optical fiber may be approximately less than 5 centimeters (cm).

The at least one operating wavelength of the optical fiber is approximately more than 1800 nanometers (nm).

DETAILED DESCRIPTION

Figure 1:
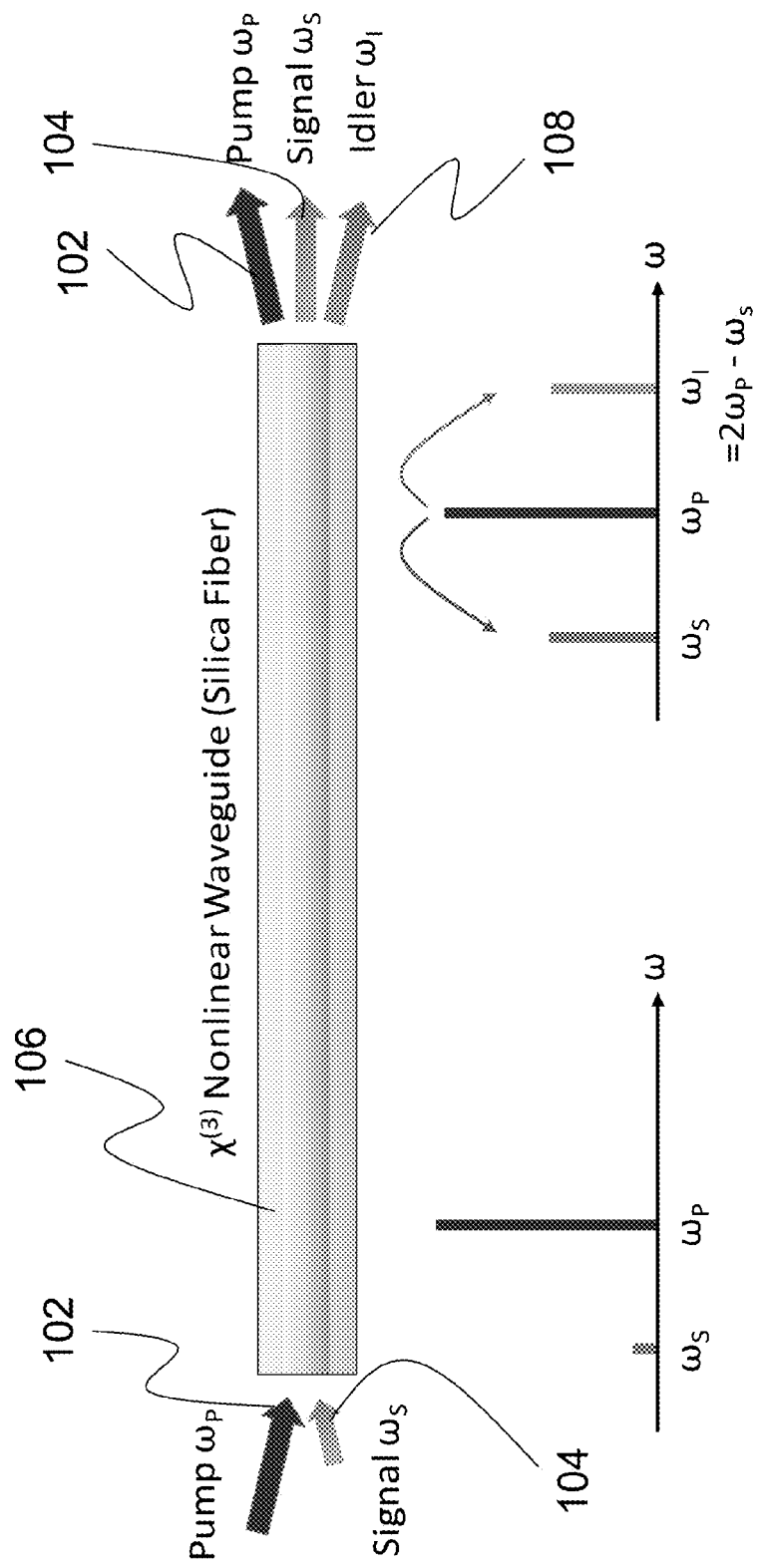
FIG. 1 is a diagram showing parametric amplification in a third-order nonlinear waveguide.

Embodiments described herein provide a new fiber design inherently resilient to transverse geometry fluctuation that is compatible with practical highly nonlinear fiber (HNLF) manufacturing processes. The embodiments rely on physical optimization of waveguiding in multi-layered fiber geometry. The effectiveness of the new HNLF type is assessed by the efficiency of a distant-band parametric mixer. In this regime, the phase-matching requires negative fourth-order dispersion to achieve gain projection to a pair of GHz-wide windows separated by 100-THz. This regime defines the most sensitive FPM process to localized dispersion fluctuation, and is a significant reason for the absence of an HNLF-based device.

Also described herein is the tolerance analysis for dispersion fluctuation of narrow and distant-band parametric amplification process. Subsequently, the origin of the large dispersion fluctuation in conventional HNLF is described, and is followed by the new design strategy used to minimize dispersion fluctuation via multi-layered cladding design. The linear and nonlinear characteristics of an exemplary design are also presented. Finally, the new HNLF type is compared with the conventional HNLF used in narrow- and distant-band mixer.

Light generation and conversion to spectrally-distant and well-defined frequency ranges in fiber optic parametric devices requires precise physical characteristics that are not met by conventional high-confinement fibers, referred to in practice as highly-nonlinear fibers (HNLF). The precise requirements for HNLF in the context of parametric light generation and conversion is uniquely defined and specified herein. In one embodiment, the HNLF is a dual-core, high confinement fiber. The dual-core, high confinement optical fiber is provided along with methods of parametric amplification for use thereof. The dual-core optical fiber includes four concentric layers which are configured to provide different guiding regimes to low-frequency and high-frequency components through transverse geometry and refractive index profiling, thus reducing waveguide dispersion change due to deviation in transverse geometry. The resulting optical fiber can achieve phase-matching in any spectral region of interest, such that a fiber optic parametric amplifier (FOPA) implementing the optical fiber can amplify in any spectral window of interest. A narrow-band FOPA configured to minimize phase mismatching is also provided for use with the dual-core optical fiber, and may be implemented as a light source or a monochromator.

Embodiments described herein harness the ability to generate narrow-band amplifying and frequency conversion windows in a fiber-optical parametric amplifier (FOPA), which can be tuned across a wide frequency range. This type of amplifier replaces the filtering element found in typical frequency-swept sources and monochromators, and brings advantages for both classes of devices not demonstrated. In the context of frequency-swept light generation, the embodiments described herein allow sweeping at a much higher speed by up-scaling the sweep rate and range of the frequency-swept pump laser. In monochromating applications, the embodiments allow a higher scanning rate and simultaneously enhance the sensitivity of the receiving back-end by converting the incident photons to more energetic bands, boosting the optical power available through amplification.

The embodiments described herein provide a new class of highly nonlinear fibers possessing dispersive characteristics invariant to transverse geometry fluctuations is described. The sensitivity to stochastic core fluctuations is reduced by order of magnitude while maintaining the fiber nonlinear coefficient. The effectiveness of the new highly nonlinear fiber type is demonstrated on stochastically perturbed distant-band mixer that could not be previously constructed with high-confinement fiber. The new fiber design offers a unique platform for ideally phase-matched parametric exchange with significantly increased Brillouin threshold.

In one aspect, the requirement of longitudinal chromatic dispersion stability along the fiber is set in order to attain satisfactory performance in practice. The fiber design concept described herein, which is designed to satisfy the need in chromatic dispersion stability without relying on unrealistic fiber fabrication accuracy, also represents a new paradigm in precise chromatic dispersion control for any fiber optical parametric device.

Embodiments of the invention described herein rely on the parametric photon exchange effect in optical fiber waveguides with third-order nonlinear susceptibility. The phenomenon is illustrated graphically in FIG. 1. When an optical wave 102 with angular optical frequency $\omega_P$, denoted as pump hereinafter, propagates with a spectrally distinct "signal" wave 104 with frequency $\omega_S$ in the waveguide 106, parametric interaction between the pump 102 and signal 104 will lead to the amplification of signal and the creation of new wave, namely idler 108, at a frequency $\omega_I$ equal to $2\omega_P - \omega_S$. If the total power acquired by the signal 104 and idler 108 constitutes an insignificant fraction of the pump 102, and the waveguide 106 is homogeneous and lossless, then the signal gain $G_S$ (and idler generation efficiency $G_I$) can be represented by the following expressions:

$$G_S = 1 + \frac{(\gamma P_P)^2}{2g^2}[\cosh(2gL) - 1] \tag{1a}$$

$$G_I = \frac{(\gamma P_P)^2}{2g^2}[\cosh(2gL) - 1] = G_S - 1 \tag{1b}$$

-continued $$g = \sqrt{(\gamma P_P)^2 - (\Delta k)^2} \tag{1c}$$

This simplified model reveals a set of design parameters for a fiber optical parametric amplifier (FOPA): its characteristics depend only on the pump power $P_P$, nonlinear coefficient of the fiber $\gamma$, and a frequency-dependent factor $\Delta k$ (denoted as total phase mismatch) which determines the spectral response. As depicted in equations (1), the strength of parametric amplification (conversion) at a particular spectral position is governed by the total phase mismatch factor $\Delta k$:

$$\Delta k = \Delta \beta + 2\beta + 2\gamma P_P \tag{2}$$

$$\Delta \beta = 2\beta(\omega_P) - \beta(\omega_S) - \beta(\omega_I) \approx \beta^{(2)}(\Delta \omega)^2 + \beta^{(4)}(\Delta \omega)^4/12 \tag{3}$$

where $\beta(\omega)$ denote the phase constant of the fiber at frequency $\omega$. The linear phase mismatch $\Delta\beta$ can be written in an explicit form by expanding the phase constant function into a Taylor series around the pump frequency, resulting in a polynomial expression in terms of the $n^{th}$-order dispersion term at pump frequency $\beta^{(n)}$, and the frequency separation between the pump and signal (or idler) $\Delta\omega = \omega_S - \omega_P$. The parametric gain is achieved when the value of phase mismatch $\Delta k$ is greater than $-2\gamma P_P$ and smaller than $+2\gamma P_P$, reaching the maximum when $\Delta k$ vanishes. In optical fiber, the overall chromatic dispersion pertinent to the phase matching condition is a combination of two contributions: material dispersion and waveguide dispersion. Material dispersion arises from the frequency-dependent retardation found in the electric response of the constituent substance to an incident electric field, and is therefore determined by the glass composition. On the other hand, waveguide dispersion arises from the frequency-dependent characteristics of guiding effect experienced by an optical beam in the waveguide structure, and is solely governed by the geometry of the waveguide. While the material dispersion engineering requires alteration of the glass composition, adjusting the waveguide dispersion by transverse geometry and refractive index profile allows for synthesis of arbitrary overall chromatic dispersion profile, thereby achieving phase-matching in any spectral region of interest. In other words, FOPA device is capable of amplifying (converting) in any spectral window of interest, limited only by the transparent window of the material. Specifically, the transverse geometry of the waveguide (fiber) is of primary interest as a control parameter in this work.

Proper phase matching for any FOPA device of interest here can be achieved by careful selection of $2^{nd}$-order and $4^{th}$-order derivatives of $\beta(\omega)$ with respect to the pump angular frequency, known as $2^{nd}$-order and $4^{th}$-order dispersion terms. In typical fiber, the $2^{nd}$-order dispersion term $\beta^{(2)}$ is defined by the operating pump frequency, whereas the $4^{th}$-order term $\beta^{(4)}$ remains largely constant within reasonable pump frequency tuning range. In practical terms, the frequency dependence of the $4^{th}$-order dispersion is much weaker than that of the $2^{nd}$-order term and can be approximated as a constant within most bands of interest. Dispersion terms of higher orders (n>4) contribute insignificantly to the phase mismatch for spectral ranges of interest and are therefore not included in equation (3). Arising from the even symmetry in $\Delta\beta$ with respect to frequency difference $\Delta\omega$, a FOPA always produces gain (conversion) bands symmetrical to the pump frequency, when higher-order nonlinear effects including Raman and Brillouin scattering are ignored. These effects are considered parasitic mechanisms for the purpose of the device construction and can be circumvented by optimized design known in the art developed prior to this disclosure.

Figure 2:
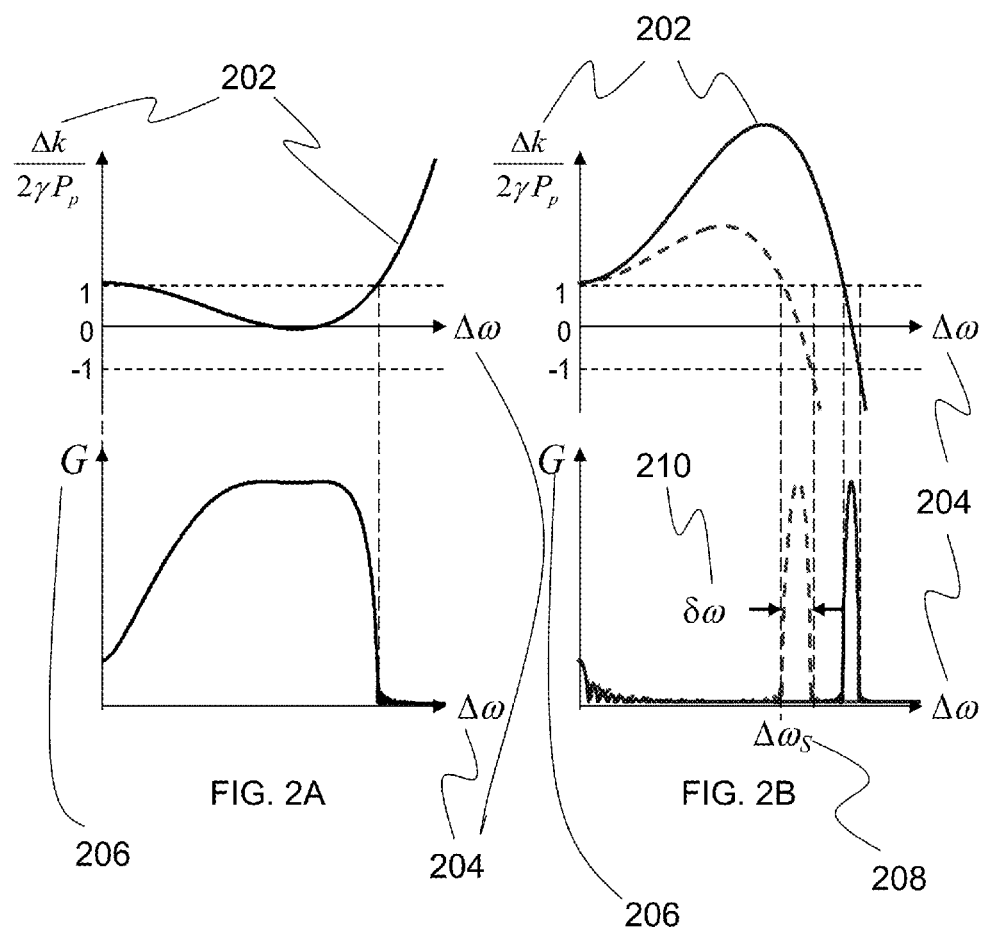
FIGS. 2A and 2B are graphs which illustrate the relationship between frequency, gain and phase mismatch.

For a typical amplifier in which a broadband gain is sought, optimal phase matching is achieved by choosing the fiber with a positive $\beta^{(4)}$ and situating the pump frequency at anomalous dispersion region, also known in the art as negative $\beta^{(2)}$ dispersion regime. FIGS. 2A and 2B illustrate phase-matching curves and gain profiles corresponding to a wide-band phase-matched FOPA (FIG. 2A) and a narrow-band phase-matched FOPA (FIG. 2B). As illustrated in FIG. 2A, the simultaneous occurrence of positive $\beta^{(4)}$ and negative $\beta^{(2)}$ provides spectrally flat, vanishingly small phase mismatch 202 over a wide spectral band 204 (change in frequency, $\Delta\omega$). The gain 206 is also shown over this range of frequencies 204 for a direct comparison with the phase mismatch 202. Conversely, a negative $\beta^{(4)}$ fiber and a pump frequency at the normal dispersion region (resulting in positive $\beta^{(2)}$ leads to a different operating regime. In this phase matching regime illustrated in FIG. 2B, a pair of narrow spectral bands, namely Stokes (S, $\Delta\omega<0$) and anti-Stokes (AS, $\Delta\omega>0$) bands, are formed at spectrally distant frequencies In this example, the signal amplification occurs in AS band, while signal frequency conversion occurs in S band. Furthermore, the spectral position of the gain bands 208 $\Delta\omega_S$ can be tuned by shifting the pump frequency $\omega_P$, directly leading to change in $\beta^{(2)}$ due to the third-order dispersion $\beta^{(3)}$ i.e. $\beta^{(2)}=\beta^{(3)}(\omega_P-\omega_0)$, where $\omega_0$ is the zero-dispersion frequency of the gain medium, corresponding to the frequency at which $\beta^{(2)}$ vanishes. The frequency offset $\Delta\omega_S$ and the bandwidth $\delta\omega$ of the gain window 210 can be approximated as:

$$\Delta\omega_S = \sqrt{\frac{12\beta_3(\omega_P - \omega_0)}{|\beta_4|}} \qquad (4)$$

$$\delta\omega = \frac{24\gamma P_P}{|\beta_4 \Delta\omega_S^3|} \qquad (5)$$

Given that the ratio $|\beta^{(3)}/\beta^{(4)}|$ exceeds 100 with common fiber design, this type of phase matching provides a levering effect for frequency-swept operation, where a narrow-band sweep at pump wavelength will results in an order-of-magnitude up-scaling in sweep range reachable by the gain bands. The large frequency offset at gain peaks also leads to narrowing of the gain bandwidth: in contrast to 100 THz produced by typical wide-band phase matched parametric amplifiers, it is possible to confine AS and S bands to less than 100 GHz by negative $\beta^{(4)}$ phase matching. Combined with the quasi-instantaneous response in silica glass, the negative $\beta^{(4)}$ phase-matched parametric amplifier enables a new regime of operation for frequency-swept light source, in which the filtering and amplification functions are unified into an optically-tuned amplifying filter.

Light Sources

Figure 3:
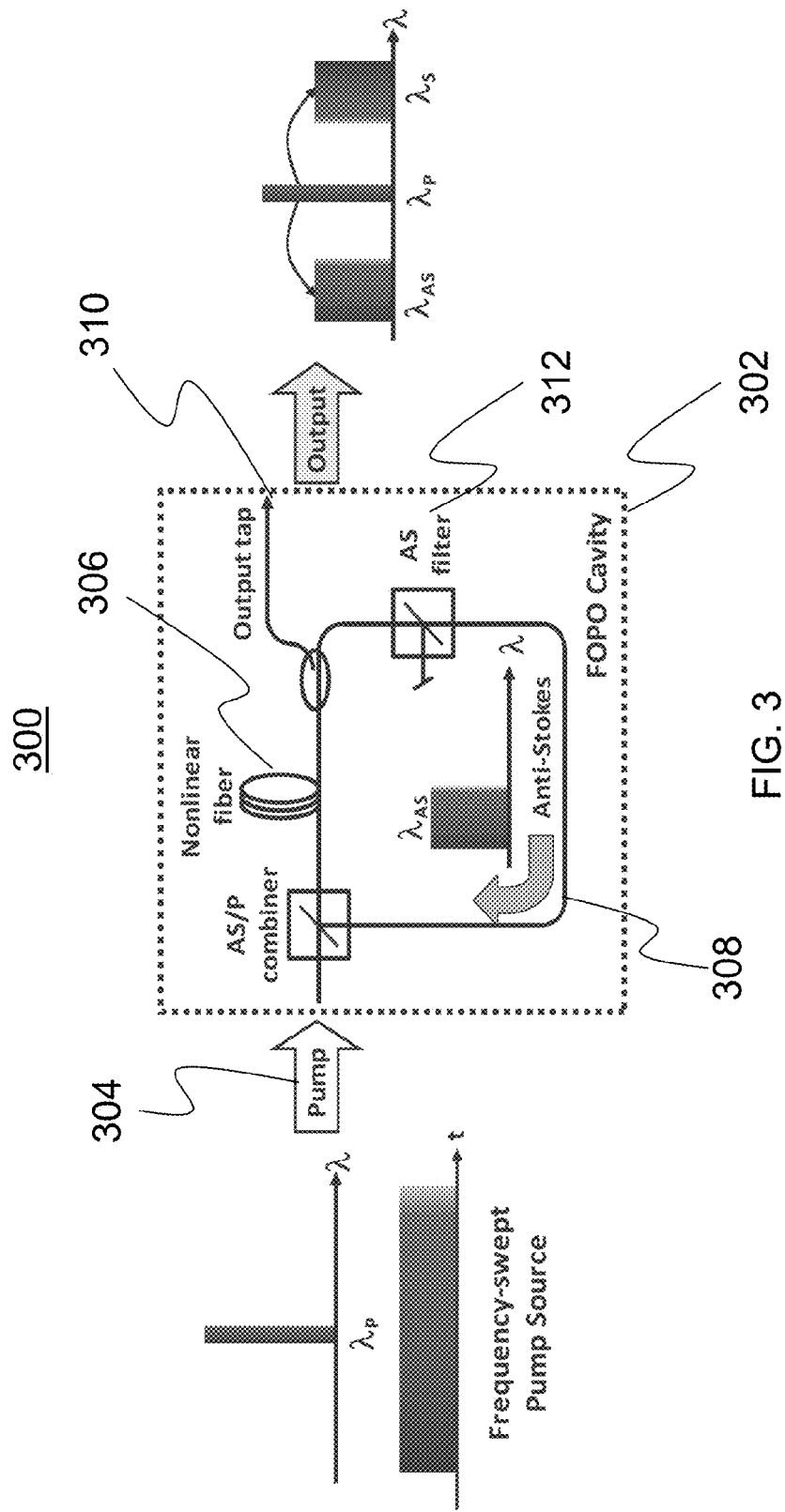
FIG. 3 is a diagram illustrating a light source which incorporates a fiber optic parametric amplifier (FOPA), in accordance with one embodiment of the invention.

In one embodiment of the invention, the aforementioned properties of narrow-band FOPAs may be utilized to realize wide-range tunable and high sweep-rate frequency-swept light sources. The light source 300 is constructed by incorporating the FOPA device into an optical cavity 302, as illustrated in FIG. 3, which allows for coherent accumulation of the lasing wave. The cavity consists of a frequency-tunable pump 304, a nonlinear fiber 306 for parametric amplification, and a feedback path 308 for the lasing wave 310. The nonlinear fiber 306 possessing negative $\beta^{(4)}$ is pumped by the frequency-tunable light source 300, with frequency range confined in the normal dispersion regime of the fiber 306 to generate a pair of narrow-band gain windows. The narrow-band gain subsequently amplifies the lasing wave (or vacuum noise to initiate lasing) in the cavity 302 and simultaneously acts as the intra-cavity filtering element to define the frequency of the lasing wave. The filters 312 in the feedback path may retain light in either one (the anti-Stokes band is shown in FIG. 3 as an example) or both of the gain bands, which will result in singly- or doubly-resonant oscillation. Due to the sweep up-scaling feature of a narrow-band FOPA, a wide-band sweep can be generated with a much narrower range swept pump. Besides providing gain to the lasing wave, the parametric process also generates an idler in the band not retained in the cavity. Consequently, access to two distant bands is achieved with a single frequency-swept element through simultaneous generation of the lasing wave and its idler, even when the cavity is the singly-resonant.

Monochromators

Figure 4:
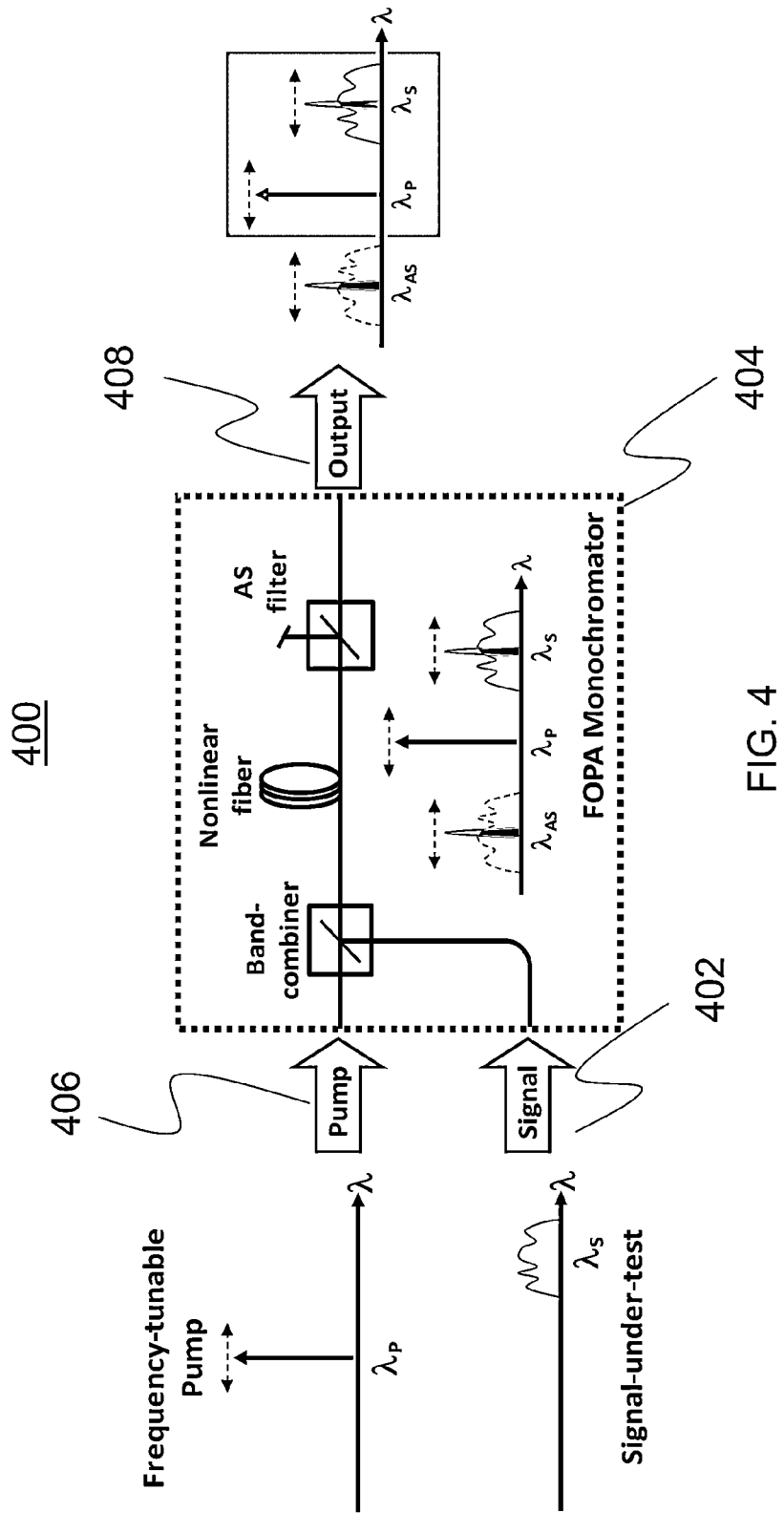
FIG. 4 is a diagram illustrating a FOPA implemented as a monochromator, in accordance with one embodiment of the invention.

In addition to the light generation, the second major contribution refers to the fact that a negative $\beta^{(4)}$ phase-matched FOPA, characterized by the narrow-band, widely tunable gain windows, can be deployed directly as a monochromator 400, as shown in FIG. 4. Instead of re-circulating and amplifying the light confined in an optical cavity as in the light source, an external optical signal 402 occupying either one of the sideband (for example, Stokes band in FIG. 4) is coupled into the input of the FOPA 404. The FOPA, being pumped by a frequency-tunable pump 406, amplifies a narrow spectral portion of the input signal and simultaneously translates the amplified spectral slice to another sideband. The monochromated output 408 is then retrieved by rejecting the original signal and the residual pump at the output of the FOPA. The advantage of such monochromator construct is multifold. First, the filter window is defined purely through the optical process, which means that wide-range mechanical or electrical tuning element found in conventional monochromator can be avoided, in favor of more rapid and durable narrow-band tuning at the pump laser. Second, the FOPA device can enhance the sensitivity of the detection back-end by converting the photons to a higher-energy band where photo-detectors are more sensitive, as well as boosting the optical power available for detection. Third, since photon exchange occurs only at the phase-matched spectral position, the FOPA-based monochromator inherently provides higher extinction ratio than conventional passive monochromators. Finally, gain saturation effect in the FOPA suppresses instantaneous power surge carried by the input, which could otherwise damage the high-sensitivity photo-sensors in the detection backend.

High-Confinement Nonlinear Optical Fibers

Another important contribution of the invention refers to the fact that devices described above are not practical using standard high-confinement fibers. Indeed, due to the strong dependence of gain (conversion) spectral shape to the dispersion parameters of the fiber medium, successful realization of the invention requires stringent control on the dispersion uniformity along the entire length of the fiber (waveguide).

When an optical pump centered at frequency $\omega_P$ is launched to silica fiber, an efficient parametric amplification (conversion) occurs within the phase-matching window, defined by:

$$-4\gamma P_P \leq \Delta\beta \leq 0 \qquad (6)$$

where $\gamma$ and $P_P$ denote the nonlinear coefficient of the fiber and peak pump power. The spectral dependency of the parametric gain is defined by the linear phase-mismatch term $\Delta\beta$. In silica, the phase mismatch is described with sufficient accuracy by the second- and the fourth-order dispersion $\beta_2$ and $\beta_4$ terms:

$$\Delta\beta = \beta_2(\omega_P-\omega)^2 + \beta_4(\omega_P-\omega)^4/12 \qquad (7)$$

When phase matching is dominated by strong negative $\beta_4$, it is possible to achieve strong spectral localization of the parametric process: instead of producing a contiguous gain band in immediate pump vicinity, parametric amplification (conversion) only occurs in a pair of narrow spectral windows centered away from the pump frequency. The frequency offset $\Delta\omega_S$ (defined relative to the pump frequency) and the bandwidth $\delta\omega$ of the gain (conversion) window are approximated by the following expressions:

$$\Delta\omega_s = \sqrt{\frac{12\beta_3(\omega_P - \omega_0)}{|\beta_4|}} \quad (8)$$

$$\delta\omega = \frac{24\gamma P_P}{|\beta_4|\Delta\omega_S^3} \quad (9)$$

where $\beta_3$ and $\omega_0$ represent the third-order dispersion and the zero-dispersion frequency (ZDF) of the fiber.

In addition to highly selective spectral response inherent to reduced gain bandwidth, this operational mode for a fiber-optical parametric amplifier (FOPA) is used to access distant bands without paying the penalty of excessive out-of-band amplified quantum noise (AQN), inherent to wide-band FOPAs. This feature is not easily accomplished in practice: the strong gain (conversion) spectral dependence on the fiber dispersion requires stringent control of the dispersion uniformity along the entire length of the mixing fiber. The importance of the distributed dispersion uniformity can be demonstrated by a gain model incorporating random dispersion fluctuation. The model predicts the mean gain attainable in a FOPA perturbed by the influence of random dispersion variation along the fiber span. The importance of the dispersion uniformity can be demonstrated by a gain model incorporating random dispersion fluctuation, in form of a perturbation $\delta\beta^{(2)}$ to the mean $2^{nd}$-order dispersion $\overline{\beta^{(2)}}$.

$$\delta\beta^{(2)}(z) = \delta\beta^{(2)}(z-\delta z)\exp(-\delta z/L_e) + p\sqrt{1-\exp(-2\delta z/L_e)} \quad (10)$$

where p is a zero-mean Gaussian random variable with standard deviation of $\sigma_b$. The perturbation in Eq. (10) corresponds to a random process with ensemble-wise Gaussian statistics of $N(0,\sigma_b)$ and an auto-correlation $\sigma_b^2 \exp(-\Delta z/L_e)$. Indeed, it is recognized that the influence of $2^{nd}$-order dispersion perturbation to a particular FOPA configuration depends on the mean dispersion coefficients $\beta^{(2)}$ and $\beta^{(4)}$, and nonlinear interaction strength $\gamma P_P$. In order to understand the influence of dispersion stability independent to the FOPA configuration, a normalized fluctuations parameter f is introduced, which is the ratio of the fluctuation of the gain peak frequency to the mean bandwidth of the gain window. Using Eq. (8) and (9) with the assumption that the perturbation $\delta\beta^{(2)}$ is a small fraction of the mean dispersion $\overline{\beta^{(2)}}$, the parameter f is expressed by the following:

$$f = \frac{|\beta^{(4)}|\overline{\Delta\omega_S^4}}{48\gamma P_P \overline{\beta^{(2)}}}\sigma_b \quad (11)$$

Figure 5:
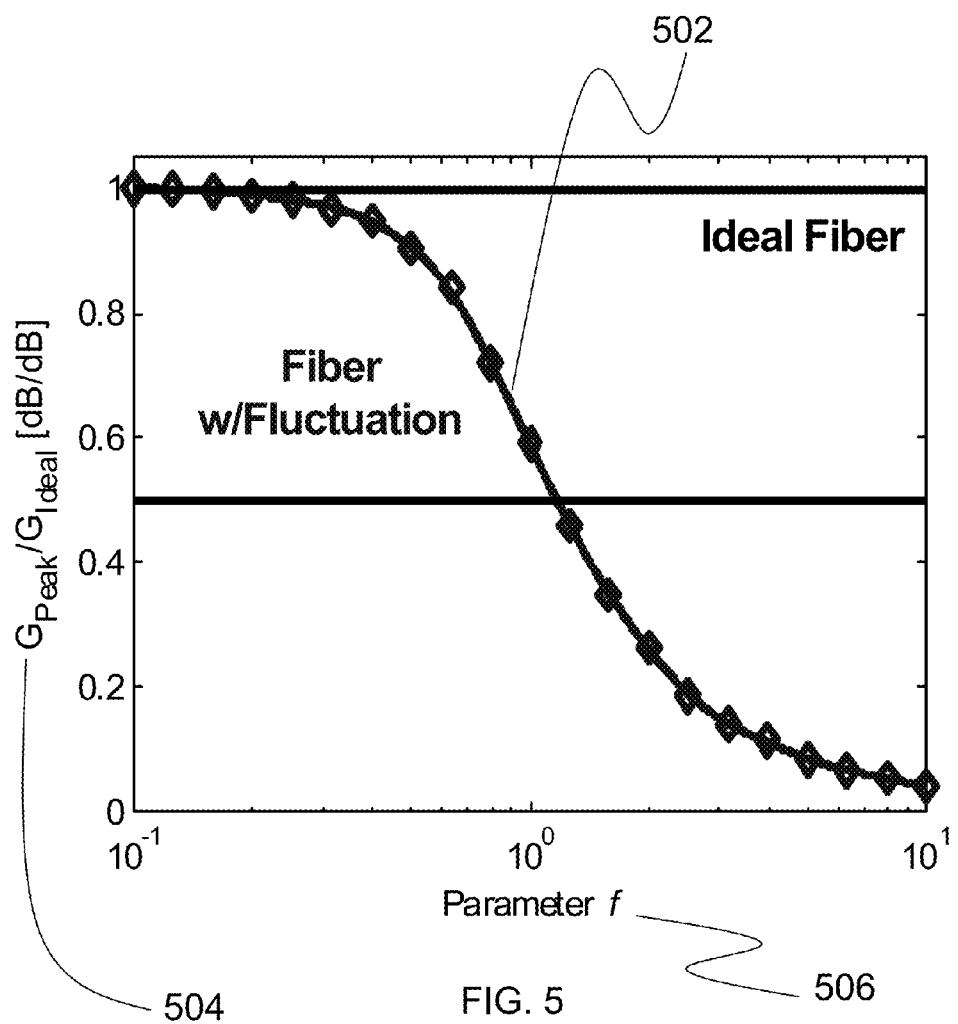
FIG. 5 is a plot showing the attainable mean gain of narrow-band FOPA in the presence of chromatic dispersion fluctuation in an optical fiber.

The analytical model predicts that the mean gain attainable in a FOPA configuration is limited by the influence of random dispersion variation along the fiber span. As an example, FIG. 5 shows the outcome of dispersion fluctuation 502 in a narrow-band phase-matched FOPA, obtained by geometrically-averaging the gain 504 in 100 realizations of the perturbed FOPA. It is readily recognized that the existence of dispersion perturbation in non-ideal fibers imposes significant penalty on the attainable gain. In one embodiment, the mixer should possess a fluctuation parameter 506 of less than 5 in order to attain acceptable performance with a reasonable (<10 W) peak pump power level. When translated to dispersion parameters using realistic configuration of $\gamma P_P=(10 \text{ W}^{-1} \text{ km}^{-1})\times(5 \text{ W})$, $\beta^{(4)}=-1\times10^{-4}$ ps$^4$/km, pump wavelength $\lambda_P=1550$ nm and Stokes wavelength $\lambda_S=2000$ nm, the dispersion fluctuation in terms of the normalized fluctuations parameter 506 ought to be maintained below 5. In one embodiment, a fluctuation factor f below $3.3 \ 8(\gamma P_P L)^{-0.454}$ is required at a correlation length of 1 m in order to attain half of the unperturbed gain level. A practical illustration can be defined by $\gamma P_P=(0.01/\text{Wm})\times(10\text{ W})$; $\beta_4=-10^{-4}$ ps$^4$/km; $\lambda_P=1550$ nm; $\lambda=2000$ nm, dictating that the HNLF dispersion (D) be maintained within $5\times10^{-3}$ ps/nm/km range.

In this particular example, the f-parameter 506 requirement translates to a dispersion stability of within 0.01 ps/nm/km. Unfortunately, this stringent requirement in dispersion control will infer to an insurmountable challenge in fiber geometry control in practical high-confinement fiber fabrication process. The use of high-confinement fibers is indispensable in practical fiber optical parametric device construction, since the high nonlinear coefficient found in this type of fiber alleviates the need for extremely high pump power and/or long fiber length to attain sufficient gain or conversion efficiency. Furthermore, the increased confinement within the fiber core (or, alternatively, the shrinkage of fiber transverse geometry) in standard high-confinement fiber waveguides provides means for achieving small chromatic dispersion by strong waveguide-dispersion effect. As described above, the dispersion shift with respect to the intrinsic silica characteristic is necessary to provide phase-matching for pumps situated in conventional telecom bands (1530-1610 nm), where high-quality and economical pump lasers are easily accessible. However, the constriction of the transverse geometry also enhances the change in dispersion due to any unintended fluctuations in the fiber transverse geometry.

Fiber dispersion control can be achieved by variety of core/cladding geometries to synthesize waveguide dispersion and offset the material dispersion of silica glass. The total dispersion of a step-index fiber waveguide is expressed as the combination of the material and waveguide contributions:

$$D = D_M + D_W + D_{MW} \quad (12)$$

where $D_M$ indicates material, $D_W$ is waveguide and $D_{MW}$ is the cross-term contribution. When expanded using standard normalized notation, the dispersion terms are expressed as:

$$D_M = M_2 \quad (13)$$

$$D_W = \left\{-\frac{\sqrt{\Delta n/2}}{2\pi c a_1 n_c}V^2\frac{d^2(Vb)}{dV^2}\right\} \quad (14)$$

$$D_{MW}\left\{(M_1 - M_2)\left[\frac{b + d(Vb)/dV}{2}\right] + \right. \quad (15)$$
$$\left. \frac{1}{cn_2}\frac{d(n_2\Delta n)}{d\lambda}\left[V\frac{d^2(Vb)}{dV^2} + \frac{d(Vb)}{dV} - b\right]\right\}$$

$$M_i = -\frac{\lambda}{c}\frac{d^2 n_i}{d\lambda^2} \quad (16)$$

$$V = \frac{2\pi a}{\lambda}\sqrt{n_1^2 - n_c^2} \ ; \ b = \frac{n_{\text{eff}}^2 - n_c^2}{n_1^2 - n_c^2} ; \Delta n = n_1 - n_c \quad (17)$$

where a, $n_1$ and $n_c$ are the core diameter, core index and cladding index of a fiber, respectively. The effective index experienced by the mode field is denoted as $n_{eff}$, while parameters V and b indicate normalized frequency and propagation constant, respectively. Since the index contrast is limited to few percents by a Rayleigh-scattering limit, variation in material dispersion is considered insignificant. In contrast, the wave-guiding contribution changes dramatically in response to subtle deviation from the designed geometry.

In conventional high-confinement fibers such as HNLFs, a single delta-like core provides highly negative waveguide dispersion to negate the material dispersion of silica. The wave-guiding characteristics of conventional designs is best illustrated by a normalized waveguide dispersion, computed by solving the scalar field equation using finite difference method. In order to provide high nonlinearity and low dispersion spread across the operational band, conventional HNLFs are designed to operate in the vicinity of the cut-off frequency where the mode field is tightly confined in the core, and the waveguide dispersion has an inverted slope with respect to the material dispersion. However, the dispersion profile in this region is highly sensitive to the geometry fluctuations: a mere 1% shift in core radius results in 3% change in dispersion. In practice, this is equivalent to 0.5 ps/nm/km deviation in total dispersion for a fiber designed to have zero dispersion wavelength (ZDW) at 1550 nm. Consequently, this also represents two orders of magnitude larger dispersive fluctuation than that allowed by a test parametric device described earlier.

Figure 6:
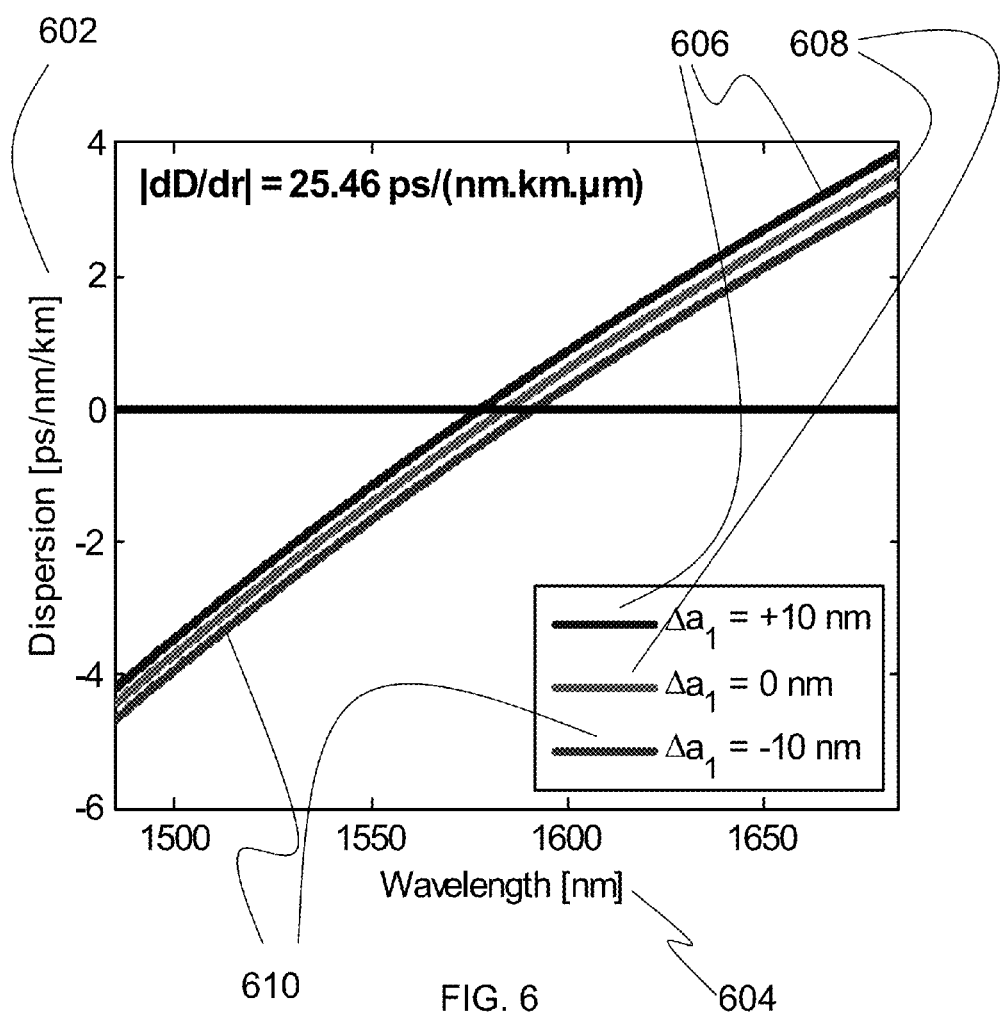
FIG. 6 is a plot showing the chromatic dispersion profiles of a high-confinement fiber subject to a 10 nanometer (nm) wavelength deviation in core radius.

FIG. 6 illustrates a dispersion profile 600 of a typical high-confinement fiber mapping dispersion 602 against wavelength 604 with three different dispersion profiles corresponding to a 10 nanometer (nm) deviation in core radius. Dispersion profile 606 corresponds to a positive 10 nm deviation, dispersion profile 608 corresponds to a deviation of 0 nm, and dispersion profile 610 corresponds to a deviation of −10 nm. As shown in FIG. 6, enforcing a dispersion accuracy of 0.01 ps/nm/km with a typical high-confinement fiber designed for telecom-band pumping requires the core radius control accuracy better than 393 picometer (pm), which is comparable to the diameter of a silicon atom at 222 pm. This requirement demonstrates the need for atomic-scale radial manipulation along the device with length up to kilometer scale.

Figure 7:
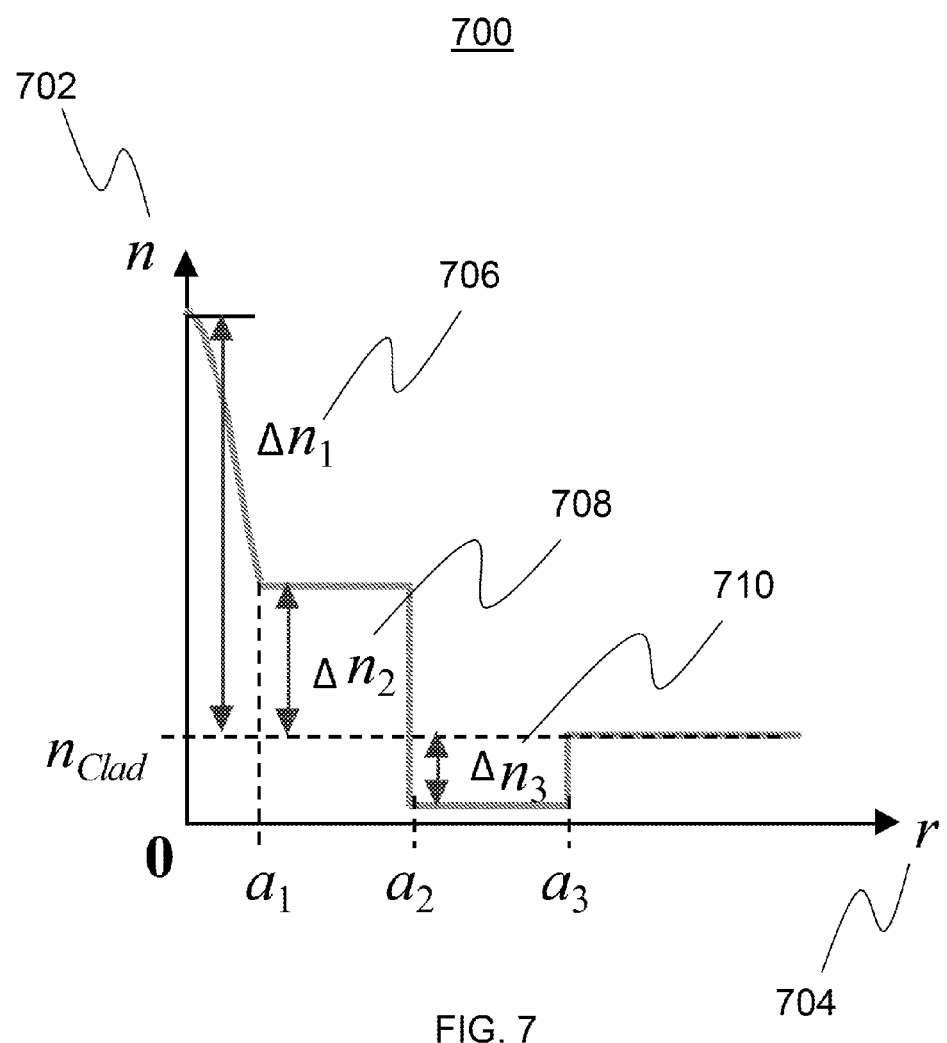
FIG. 7 is diagram of a dual-core optical fiber illustrating the function of four concentric layers, in accordance with one embodiment of the invention.

In one embodiment, the required dispersion stability can be provided by a multi-layered waveguide design without compromising confinement capability. Facing the difficulty in achieving the required geometry control accuracy in typical fiber geometry, a new class of fiber transverse geometry and refractive index profile are required to relax the tolerance. A refractive index profile 700 of one embodiment of a fiber design resistant to geometry variation is shown in FIG. 7, plotting a refractive index 702 against a distance 704 from an axis of the fiber. Departing from conventional design strategy incorporating a single-core structure, in one embodiment, the required confinement and dispersion stability can be provided by a multi-layered waveguide design. The design consists of four concentric layers whose refractive index profiles are represented in FIG. 7—an inner core 706 ($a_1$, $\Delta n_1$) defining the mode-confinement characteristics, an outer core 708 ($a_2$, $\Delta n_2$) serving to modify the dispersion profile, an intermediate cladding layer 710 ($a_3$, $\Delta n_3$) which supports guiding for both cores, and the outer cladding (not shown) providing mainly mechanical support. The underlying principle can be understood by first noticing that the optical field at lower frequency acquires wider beam waist within the waveguide. The double-core geometry then serves to impose a different guiding regime to the low-frequency and high-frequency components of the optical field by utilizing the dependence of beam waist on frequency. An optical field with a higher frequency will experience guiding by the inner core, with the outer core acting as the cladding; whereas a low-frequency field (higher V-number) is confined by the outer core.

Figure 8:
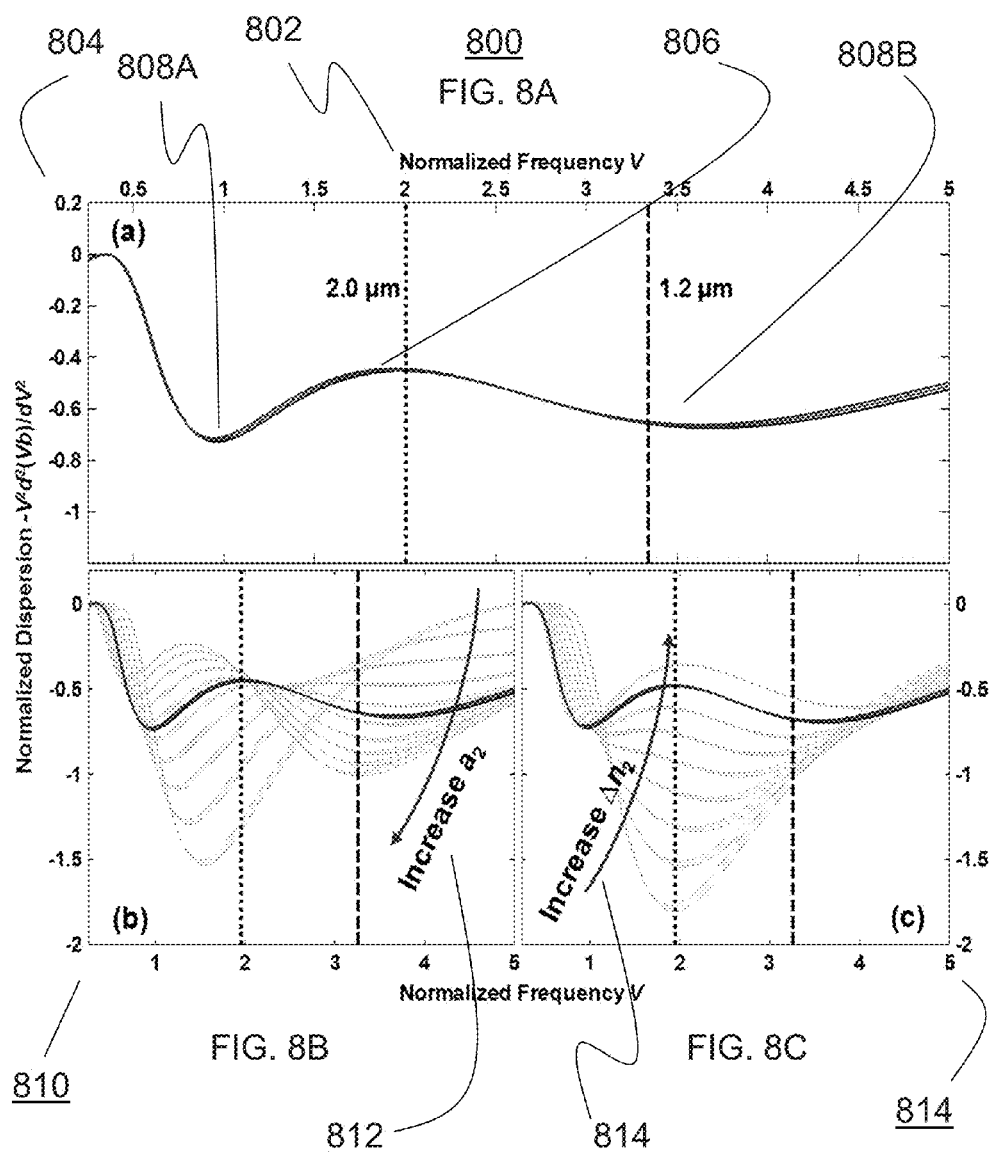
FIG. 8A is a graph illustrating the disparity in guiding characteristics between an inner core and an outer core of the optical fiber, in accordance with one embodiment of the invention.
FIGS. 8B and 8C are graphs illustrating chromatic dispersion profiles, in accordance with one embodiment of the invention.

The disparity of guiding characteristics between these two regimes results in a double-dip dispersion profile 800 of an optimal double-core profile, as shown in FIG. 8A, which plots a normalized frequency 802 against a normalized dispersion 804. When the profile 800 is stretched radially, a saddle region 806 sandwiched between the depressions 808A and 808B will see an opposite dispersion shift being exerted by the inner core and outer core, thereby reducing the net dispersion shift. As demonstrated in FIGS. 8B and 8C, the dispersion profile 810 for increasing the outer core radius 812 (FIG. 8B) and the dispersion profile 814 for increasing an index contrast 816 (FIG. 8C) provide a comprehensive mechanism to position the saddle region and minimize dispersion fluctuation. The desired waveguide dispersion can be obtained by adjusting the index contrast 816, while radial trimming of the outer core radius 812 will control the extent of dispersion fluctuation and shift the frequency range where the saddle region is situated.

Figure 9:
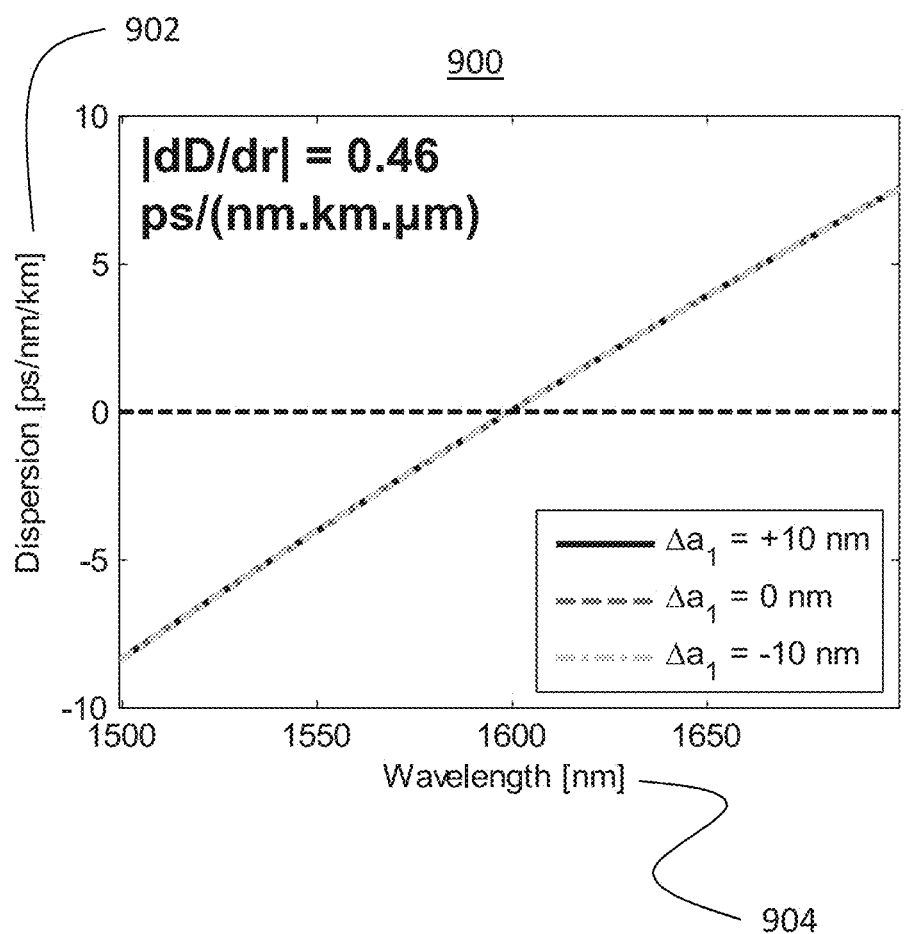
FIG. 9 is a graph of a chromatic dispersion profile of a dual-core fiber subject to 10 nm wavelength core radius perturbation, in accordance with one embodiment of the invention.

In comparison to conventional high-confinement fiber, the dispersion profile of the fiber geometry described herein is significantly less sensitive to core size variation. For instance, as illustrated in the dispersion profile 900 in FIG. 9, the exemplary fiber design has a dispersion variation 902 at telecom band (1550 nm) 904 reduced by 91% as compared to single-core design. The benefit of the new fiber design for negative $\beta^{(4)}$ phase-matched FOPA is prominent. More importantly, this reduction is achieved while attaining field-confinement metric similar to the standard HNLF, as characterized by an effective mode area of 16.2 $\mu m^2$ (24.7 $\mu m^2$) at 1550-nm (2000-nm) wavelength, versus 11.3 $\mu m^2$ (16.5 $\mu m^2$) for the conventional HNLF design. The nonlinear coefficients ($\gamma$) at 1550 nm, calculated with consideration of glass composition, were 11.4 and 18.8 $W^{-1}$ $km^{-1}$ for the new and conventional design examples respectively. The new design maintained single-mode operation within the telecom band, characterized by a cut-off wavelength at 1480 nm. While the example design allows higher-order mode ($LP_{11}$) to propagate at short wavelength, the large index contrast (>0.01) between the fundamental ($LP^3_{01}$) and higher-order mode over the band from 1100 nm to 1480 nm guarantee negligible mode coupling within the operating band (1200 to 2000 nm) of a parametric mixer pumped by telecom-band lasers.

Figures 10A, 10B:
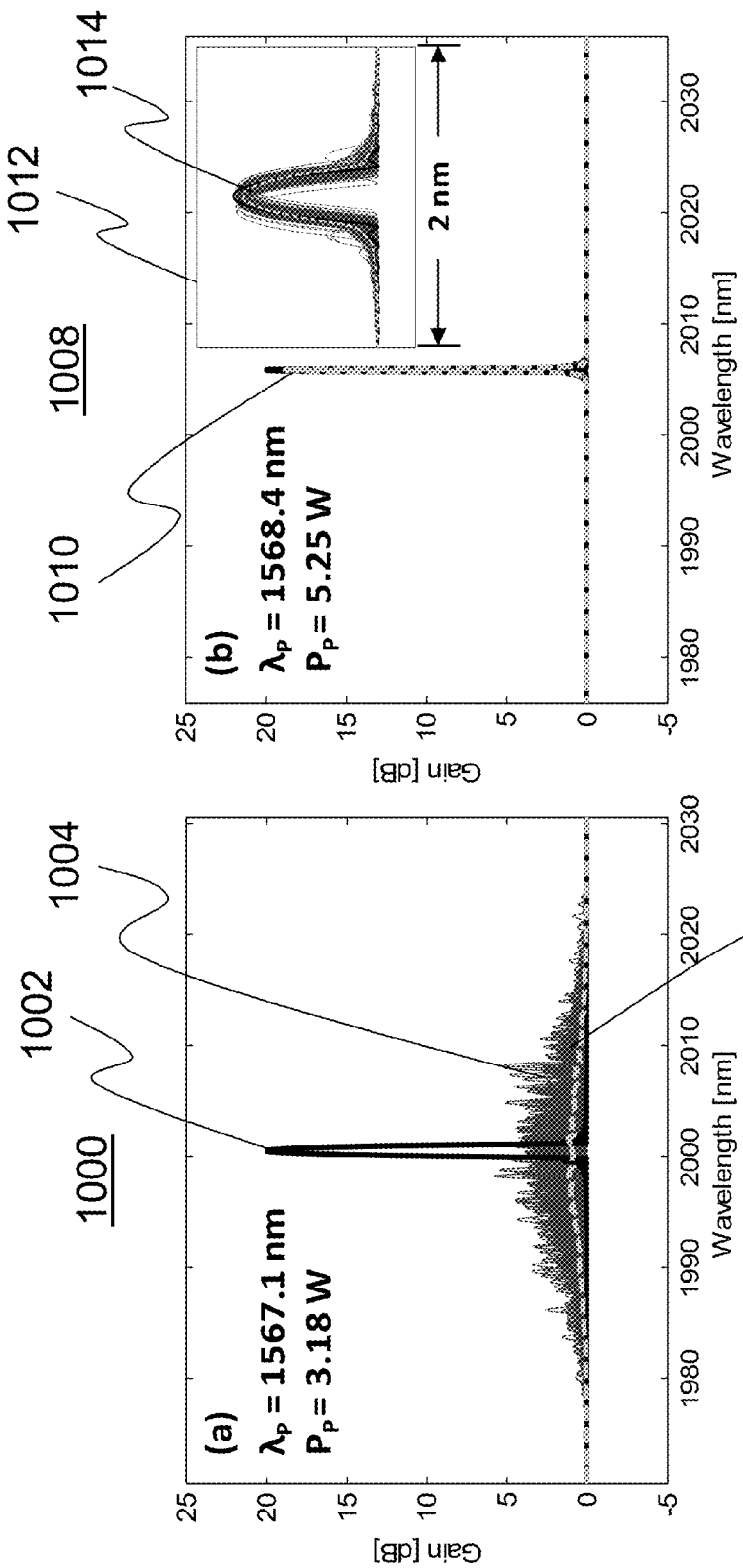
FIG. 10A is a graph which depicts a simulated FOPA gain profile of a high-confinement fiber.
FIG. 10B depicts a simulated FOPA gain profile of a geometry-variation insensitive fiber, in accordance with one embodiment of the invention.

The benefit of the new fiber design was quantified using a numerical model of the narrow-band parametric amplification process, taking into account of dispersion fluctuations due to stochastic transversal geometry variation along the fiber span. The model evaluated the gain attainable with a 50-m fiber section, where the core-radius variation of the fiber was characterized by a standard deviation of 1 nm and a correlation length of 1 m. FIGS. 10A and 10B show the gain profiles produced by conventional and newly-designed fibers, aggregated over 100 random realizations of longitudinal core-radius variation profiles. FIG. 10A shows a simulated FOPA gain profile 1000 of a conventional HNLF type produced by fibers under 1-nm radial geometry variation along the propagation axis, with the tall, black trace 1002 showing a gain profile of an ideal (unperturbed) fiber, the smaller traces 1004 showing the gain produced by each member of the geometry perturbation ensemble, and the dashed line 1006 representing the average gain profile. FIG. 10B shows a FOPA gain profile 1008 of the HNLF type incorporating geometry-variation desensitized design according to the embodiments described herein. In FIG. 10B, the gain profile of the newly-designed fiber is shown, where the dotted line 1010 illustrates the average gain profile, showing an extremely high gain across a narrow bandwidth range. Inset 1012 is shown to illustrate the smaller traces 1014 of the gain produced by each member of the geometry perturbation ensemble, which is distributed over only 2 nm. In 100 realizations of the random perturbation, the new fiber design profiled in FIG. 10B demonstrated more than a 10 dB enhancement in average gain 1004 as compared to the average gain 1006 of the typical design in FIG. 10A. When compared in terms of number of conforming fibers, all realizations of the new fiber design produced gain above half of the ideal gain level, whereas none of the typical design attained the same level of performance. The pump power Pp and wavelengths $\lambda_p$ were chosen to produce 20-dB of gain centered at 2-μm wavelength in the absence of geometry fluctuations. The benefit of the new design is evident: the new fiber attained 17-dB higher average gain, despite under a more stringent condition due to the fact that the gain window produced by the new fiber was 3.6 times narrower than that by the conventional fiber.

Although the aforementioned dispersion stability requirement is set for the specific optical parametric device configuration for distant-band light generation, maintaining unperturbed phase-matching and small modal area are as well crucial for near-band parametric interaction in noise and efficiency regards. In one embodiment, local chromatic dispersion is maintained to within 0.05 ps/nm/km at an effective mode area below 50 μm$^2$ in order to synthesize fiber optical parametric mixers with reasonably uniform spectral response (within 3-dB across the desired mixing bandwidth) and noise figure performance (less than 3-dB degradation within the mixing bandwidth) and at a pump power level reachable by telecom-grade components (5 watts). Even though this combination of dispersion stability and effective mode area metrics are reachable with conventional high-confinement fiber design in occasions, no reproducible result at this level of optical fiber fabrication has been reported.

The challenge in maintaining dispersion stability is further perplexed by the introduction of differential temperature or tensile strain along the optical fiber span for increasing the threshold of Brillouin scattering. Brillouin scattering is a nonlinear optical process which encompasses the interaction between photons and acoustic-mode phonons. The effect of Brillouin scattering is particularly pronounced in high-confinement fibers due to higher nonlinear interaction efficiency, and the outcome is detrimental since the direction of photon propagation is reversed by acoustic phonon scattering, thereby reducing useful optical power in the fiber length span, as well as creating a standing wave strong enough to induce catastrophic damage to the optical fiber. While applying temperature and/or tensile strain gradient along an optical fiber can effectively quench the accumulation of acoustic phonons, thereby increasing the optical power threshold at which strong Brillouin scattering initiates, the gradient also changes the fiber transversal geometry through thermal expansion and mechanical stress and resulting in an introduced dispersion fluctuations. Reducing dispersion fluctuations in this regard is therefore achievable by a fiber cross-section optimization concept described herein, but not with the conventional approach where dispersion stability is attained solely in fabrication.

While the above embodiment of the fiber transverse structure is used as an example, a fiber transverse profile possessing the stability with respect to transverse fluctuations is necessary for construction of optical fiber devices based on optical parametric processes utilizing the combination of $\beta^{(2)}>0$ and $\beta^{(4)}<0$. Specifically, any transverse fiber geometry and index profile corresponding to the effective fiber area lower than that of the dispersion shifted fiber (approximately lower than 50 μm$^2$) and possessing sufficient stability of the dispersion characteristics with respect to the transverse fluctuations induced during the fabrication or post-processing is within the scope of this disclosure. The specific fiber profile has sufficient stability if such variations induce dispersive fluctuations that are sufficiently small not to adversely affect the parametric gain/conversion of the FOPA device described here.

The embodiments described above describe a new highly-nonlinear fiber design with inherent dispersion resilience to transverse waveguide fluctuation. The new fiber design relies on an additional guiding layer surrounding the central core. This layer cancels the waveguide dispersion shift due to core diameter fluctuations while preserving confinement capability. The efficiency of the new HNLF type was explored using parametric amplification phase-matched by negative fourth-order dispersion. This mixer type was specifically chosen as no known HNLF type has been successfully used in its construction. While the conventional HNLF design requires sub-atomic level of precision in core diameter, the new design relieved the tolerance by more than an order of magnitude, bringing it well within the range of practical fabrication process. In terms of parametric gain synthesis, the new fiber provided near-ideal gain level associated with uniform fiber, in sharp contrast to non-existent gain generated by the conventional HNLF type. Consequently, the new fiber design principle should render mass-scale manufacturing of parametric devices considerably more economical, by easing the need for post-fabrication characterization and correction of nonlinear fiber dispersion used to date.

More importantly, the new HNLF type allows for longitudinal strain to be introduced for stimulated Brillouin scattering suppression with near impunity with respect to dispersive fluctuations. As a result, the new HNLF type should lead to ideally phase-matched mixers with qualitatively increased Brillouin threshold, thus removing the impairments from standard Brillouin mitigation techniques.

While various embodiments of the present invention have been described above, it should be understood that they have been presented by way of example only, and not of limitation. The breadth and scope of the present invention should not be limited by any of the above-described exemplary embodiments. Where this document refers to technologies that would be apparent or known to one of ordinary skill in the art, such technologies encompass those apparent or known to the skilled artisan now or at any time in the future. In addition, the invention is not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the present invention.

References (Incorporated herein by Reference):

M. Farahmand and M. de Sterke, "Parametric amplification in presence of dispersion fluctuations," *Optics Express* 12, 136-142 (2004)

M. Onishi, et al., "Highly nonlinear dispersion-shifted fibers and their application to broadband wavelength converter," *Optical Fiber Technology* 4, 204-214 (1998)

F. Yaman, et al, "Impact of dispersion fluctuations on dual-pump fiber-optic parametric amplifiers," *IEEE Photonics Technology Letters* 16, 1292-1294 (2004).

P. Velanas, et al., "Impact of dispersion fluctuations on the noise properties of fiber optic parametric amplifiers," *Journal of Lightwave Technology* 24, 2717-2178 (2006).

S. Radic, and C. J. McKinstrie, "Optical amplification and signal processing in highly nonlinear optical fiber," *TEICE Trans. Electron.* E88 C, 859-869 (2005).

M. A. Foster, et al., "Broad-band optical parametric gain on a silicon photonic chip," *Nature* 441, 960-963 (2006).

M. Galili, et al., "Breakthrough switching speed with an all-optical chalcogenide glass chip: 640 Gbits/s demultiplexing," *Opt. Express* 17, 2182-2187 (2009).

S. Radic, "Parametric Signal Processing," *IEEE Select. Topics Quantum Electron.* 18 Issue 2, 670-680.

A. O. J. Wiberg, et al., "640-Gb/s transmitter and self-tracked demultiplexing receiver using single parametric gate," *IEEE Photon. Technol. Lett.* 23, 507-509 (2011).

R. Slavik, et al., "All-optical phase and amplitude regenerator for next-generation telecommunications systems," *Nature Photon.* 4, 690-695 (2010)

B. P. P. Kuo, et al., "Transmission of 640-Gb/s RZ-OOK Channel over 100-km SSMF by wavelength-transparent conjugation," *J. Lightwave Technol.* 29, 516-523 (2011).

H. Sunnerud, et al., "Optical add-drop multiplexer based on fiber optical parametric amplification," in *Proc. ECOC* 2007, paper 5.3.5.

A. O. J. Wiberg, et al., "Performance of self-seeded parametric multicasting of analog signal," *IEEE Photon. Technol. Lett.* 23, 1570-1572 (2011).

R. Jiang, et al., "Continuous-wave band translation between the near-infrared and visible spectral ranges," *J. Lightwave Technol.* 25, 58-66 (2007).

F. Gholami, et al., "10 Gbps parametric short-wave infrared transmitter," in *Proc. OFC/NFOEC* 2011, paper OThC6, 2011.

M. Hirano, et al., "Silica-based highly nonlinear fiber and their application," *IEEE I Select. Topics Quant. Electron* 15, 103-113 (2009).

E. Myslivets, et al., "A new class of high-resolution measurements of arbitrary-dispersion fibers: localization of four-photon mixing process," *J. Lightwave Technol.* 27, 364-375 (2009).

M. Yu, et al., "Modulation instabilities in dispersion flattened fibers," *Phys. Rev. E* 52, 1072-1080 (1995).

M. E. Marhic, et al., "Wide-band tuning of the gain spectra of one-pump fiber optical parametric amplifiers," *IEEE J. Select. Topics Quantum Electron.* 10, 1133-1141 (2004).

B. P.-P. Kuo, et al., "Simultaneous wavelength-swept generation in NIR and SWIR bands over combined 329-nm band using swept-pump fiber optical parametric oscillator," *J. Lightwave Technol.* 29, 410-416 (2011).

A. Geishikov, et al., "Fiber parametric oscillator for the 2 μm wavelength range based on narrowband optical parametric amplification," *Opt. Lett.* 35, 3198-3200 (2010).

S. Moro, et al., "Synthesis of equalized broadband parametric gain by localized dispersion mapping," IEEE Photon. Technol. Lett. 20, 1971-1973 (2008).

E. Myslivets, et al., "Dispersion fluctuation equalization nonlinear fibers of spatially controlled tension," in Proc. OFC/NFOEC 2010, paper OTuAS, 2010.

L. H. Gabrielli, et al., "Robustness optimization of fiber index profiles for optical parametric amplifiers," J. Lightwave Technol. 27, 5571-5579 (2009).

J. M. Chavez Boggio, et al., "Tunable parametric all-fiber short-wavelength IR transmitter," *J. Lightwave Technol.* 28, 443-447 (2010).

L. B. Jeunhomme, *Single-Mode Fiber Optics: Principles and Applications* (Dekker, New York, 1990).

V. A. Bogatyrev, et al., "A single-mode fiber with chromatic dispersion varying along the length," *J. Lightwave Technol.* 9, 561-566 (1991).

A. Snyder, et al., Optical Waveguide Theory (Kluwer, London, 2000).

T. Kato, et al., "Estimation of nonlinear refractive index in various silica-based glasses for optical fibers," Opt. Lett. 20, 2279-2284 (1995).

A. Wada, et al., "Suppression of stimulated Brillouin scattering by intentionally induced periodic residual—strain in single-mode optical fibers," *IEICE Trans. Commun.* E76-B, 345-351 (1993).

P. Kylemark, et al., "Impact of pump phase-modulation on the bit-error rate in fiber-optical parametric-amplifier-based systems," *IEEE Photon. Technol. Lett.* 19, 79-81 (2007).

What is claimed is:

1. A transverse geometry-insensitive optical fiber, comprising:
   an inner core having a first refractive index and an inner core radius;
   an outer core concentrically surrounding the inner core, the outer core having a second refractive index less than the first refractive index and an outer core radius, wherein a difference between the second refractive index and the first refractive index defines an index contrast, wherein the inner core radius and the outer core radius comprise a transverse geometry of the optical fiber;
   at least one cladding layer concentrically surrounding the outer core, the at least one cladding layer having a third refractive index less than the second refractive index; and
   a dispersion accuracy, in terms of a normalized dispersion fluctuation parameter f, within a range of 0.07 to 5, and a dispersion fluctuation of less than 1 ps/nm/km in response to a 1 percent change in transverse geometry for a frequency range between 1200 nm and 2000 nm, wherein the dispersion accuracy is based on the index contrast and the dispersion fluctuation is based on the outer core radius.

2. The optical fiber of claim 1, wherein the effective mode area of the optical fiber is less than approximately 50 μm$^2$ (square micrometers).

3. The optical fiber of claim 1, wherein the optical fiber is connected with a fiber optic device which is configured to execute a parametric process within the optical fiber.

4. The optical fiber of claim 1, further comprising an intermediate cladding layer positioned between the outer core and the at least one cladding layer.

5. The optical fiber of claim 1, wherein an absolute value of a fourth order dispersion term $\beta^{(4)}$ of the optical fiber at an optical wavelength between 1530 nm and 1610 nm is not more than approximately $1\times10^{-54}$ s$^4$/m.

6. A fiber optic parametric amplifier device adapted to perform a parametric process using the optical fiber of claim 1.

7. The optical fiber of claim 1, wherein the inner core and the outer core have a waveguide dispersion profile at a selected frequency range, waveguide dispersion profile comprising a saddle region disposed between two local minima, wherein a location of the saddle region within the selected frequency range and the dispersion fluctuation within the saddle region are based on the outer core radius.

8. A transverse geometry-insensitive optical fiber, comprising:
a double core having a waveguide dispersion profile at a selected frequency range, the double core comprising:
an inner core having a first refractive index and an inner core radius;
an outer core concentrically surrounding the inner core, the outer core having a second refractive index lower than the first refractive index and an outer core radius, wherein a difference between the second refractive index and the first refractive index defines an index contrast and the inner core radius and the outer core radius comprise a transverse geometry;
a dispersion accuracy and a dispersion fluctuation tuned to the selected frequency range between 1200 nm and 2000 nm, wherein the dispersion accuracy, in terms of a normalized dispersion fluctuation parameter f, is within a range of 0.07 to 5 and based on the index contrast, wherein the dispersion fluctuation is less than approximately 1 ps/nm/km in response to a one percent transverse geometry perturbation, and wherein the waveguide dispersion profile comprises a saddle region disposed between two local minima, wherein a location of the saddle region within the selected frequency range and the dispersion fluctuation within the saddle region are based on the outer core radius; and
at least one cladding layer concentrically surrounding the outer core, the at least one cladding layer having a third refractive index lower than the second refractive index.

9. The optical fiber of claim 8, wherein the effective mode area of the optical fiber is less than approximately 50 $\mu m^2$ (square micrometers).

10. The optical fiber of claim 8, wherein the optical fiber is connected with a fiber optic device configured to execute a parametric process within the optical fiber.

11. The optical fiber of claim 8, wherein the at least one cladding layer comprises an outer cladding layer and an intermediate cladding layer disposed between the outer core and the outer cladding layer.

12. The optical fiber of claim 8, wherein an absolute value of a fourth order dispersion term $\beta^{(4)}$ of the optical fiber at an optical wavelength between 1530 nm and 1610 nm is not more than approximately $1 \times 10^{-54}$ $s^4/m$.

13. A fiber optic parametric amplifier using the optical fiber of claim 8.

14. The optical fiber of claim 8, wherein the selected frequency range has a low frequency component and a high frequency component, and wherein the inner core radius and first refractive index are configured for guiding the high frequency component, and the outer core radius and second refractive index are configured for guiding the low frequency component.

* * * * *

UNITED STATES PATENT AND TRADEMARK OFFICE
CERTIFICATE OF CORRECTION

| | | |
|---|---|---|
| PATENT NO. | : 9,110,352 B2 | Page 1 of 1 |
| APPLICATION NO. | : 13/935369 | |
| DATED | : August 18, 2015 | |
| INVENTOR(S) | : Ping Piu Kuo | |

It is certified that error appears in the above-identified patent and that said Letters Patent is hereby corrected as shown below:

On the Title Page:

(57) ABSTRACT

Right Column, Abstract, line 2    After "thereof" please insert a --.--.

In the Specification:

Col. 3, line 34    Please delete "The the" and insert --The-- therefor.

Col. 7, line 19    After "frequencies" please insert a --.--.

Signed and Sealed this
Sixteenth Day of February, 2016

Michelle K. Lee
*Director of the United States Patent and Trademark Office*